United States Patent [19]
Hoopes

[11] Patent Number: 6,058,171
[45] Date of Patent: May 2, 2000

[54] UNIQUE RING CALLER ID

[75] Inventor: Thomas A. Hoopes, Sandy, Utah

[73] Assignee: Oakley Telecom, LC, Salt Lake City, Utah

[21] Appl. No.: 08/689,803

[22] Filed: Aug. 14, 1996

[51] Int. Cl.[7] .......................... H04M 1/56; H04M 15/06
[52] U.S. Cl. .......................... 379/142; 379/373; 379/374
[58] Field of Search .................... 379/142, 372, 379/373, 375, 376, 179, 394, 399, 164, 183, 171, 182, 354, 362, 377, 374

[56] References Cited

U.S. PATENT DOCUMENTS

| | | | |
|---|---|---|---|
| 4,477,697 | 10/1984 | Judd et al. | 379/373 |
| 4,508,937 | 4/1985 | Burger et al. | 379/373 |
| 4,866,766 | 9/1989 | Mitzlaff | 379/373 |
| 4,939,775 | 7/1990 | Houck et al. | 379/373 |
| 4,998,273 | 3/1991 | Nichols | 379/373 |
| 5,323,451 | 6/1994 | Yatsunami | 379/373 |
| 5,425,089 | 6/1995 | Chan et al. | 379/373 |
| 5,446,785 | 8/1995 | Hirai | 379/142 |
| 5,481,594 | 1/1996 | Shen et al. | 379/67 |
| 5,490,205 | 2/1996 | Kondo et al. | 379/67 |
| 5,550,900 | 8/1996 | Ensor et al. | 379/142 |
| 5,610,978 | 3/1997 | Purits | 379/373 |

*Primary Examiner*—Paul Loomis
*Assistant Examiner*—Rexford N. Barnie
*Attorney, Agent, or Firm*—Mark G. Pannell

[57] ABSTRACT

A system and method for suppressing ring signal pulses on a telephone line, the system comprises: (a) determining means for determining a duration and a frequency of the ring signal pulses, and (b) attenuating means, responsive to the duration and the frequency of the ring signal pulses, for attenuating the ring signal pulses. Attenuating the ring pulses includes limiting the voltage difference between TIP and RING lines during the ring pulses to suppress the ring signal or a portion of the ring signal on each telephone connected to the same line.

16 Claims, 6 Drawing Sheets

6,058,171

UNIQUE RING CALLER ID

TECHNICAL FIELD

This invention relates to communication technology and, more particularly, to a system and method for producing a unique ring based on the telephone number of a caller.

BACKGROUND OF THE INVENTION

Recent advances in telephone services have provided telephone customers with a caller identification (ID) feature. This feature allows telephone subscribers to determine the telephone number of a caller if the subscribers have the appropriate caller ID decoding device and subscribe to a caller ID service. Features of these caller ID devices typically include a display, memory for storing the names and telephone numbers of known callers, and memory for storing the telephone numbers of previous callers. The display is used for showing information about the call, including the telephone number of the caller, the caller's name, and the date and time of the call. The telephone company provides the number and/or name of the caller. The date and time may either be provided by the telephone company or the caller ID device.

When a call is made to a person in the U.S. subscribing to a caller ID service, the information concerning the telephone number of the caller is provided on the telephone line via a digital data stream between the first and second ring signals. Other countries may provide the information at different times in the ring cadence. The caller ID device typically decodes the information and displays the telephone number of the caller on a viewing screen of the device. Often the name of the person calling is also displayed if such information is provided by the caller ID service or the device has been programmed to associate the telephone number of the current caller with a particular name. In order for the person being called to determine if the call is one which that person wishes to answer, the video display must be examined. If the video display is in a different location from the person being called, it may be inconvenient or impractical to go to the location where the telephone number and/or name of the caller is displayed.

Prior solutions to this problem have been for the caller ID device to produce an audio signal which identifies the caller or telephone number of the caller. One of these devices is disclosed in U.S. Pat. No. 5,490,205 wherein one of two ringing sounds is broadcast over a loudspeaker to identify specific callers. However, if the person being called is at a telephone extension other than the one connected to the device the broadcast ringing sounds may not be heard. In this case, a single device with an audio signal has little advantage over a caller ID device which merely has a video display. That is, the person being called will still have to go to the location of the caller ID device or to install multiple audio signal devices.

Accordingly, objects of the present invention are to provide a caller ID device which modifies the ring signal on a standard telephone line to produce unique rings on all telephones connected to the same line as the caller ID device, the unique rings being in response to a comparison between the telephone number of the current caller and telephone numbers stored in the device.

SUMMARY OF THE INVENTION

The device and method of this product permits a user to identify a caller through a specific ring pattern of all telephones on a common parallel circuit. Caller identification information must be supplied to the device by way of the local telephone service provider. Upon receipt of caller identification information, the user may review the incoming message and delete or add it to an electronic telephone book or database that is maintained within the device to be used in receiving and identifying future calls. The user may select from several different ring styles, including normal, short, double short or two digital voice prompts. Parallel operations allow all telephones that are on the same line (local loop) to be supported by this unique ring feature. The user is alerted by a unique ring that is presented to all standard telephones in a parallel fashion as is found in all homes. This unique parallel approach allows all standard telephones to ring with a modified or normal cadence, yet does not require re-wiring of individual telephones on the circuit. The unique ring feature allows the user to decide whether to answer the call, ignore it or allow it to be answered by an answering machine with a pre-recorded message.

The user can alternatively instruct the telephone to ring differently if a call is placed by a party that has not been identified. Some callers may have elected to have their call identity masked by having the telephone company issue an anonymous caller identification. The present invention may be programmed to either ring uniquely or automatically pick up the call and issue a digital voice response.

Other objects, advantages, and capabilities of the present invention will become more apparent as the description proceeds.

DETAILED DESCRIPTION OF THE INVENTION

Figure 1:
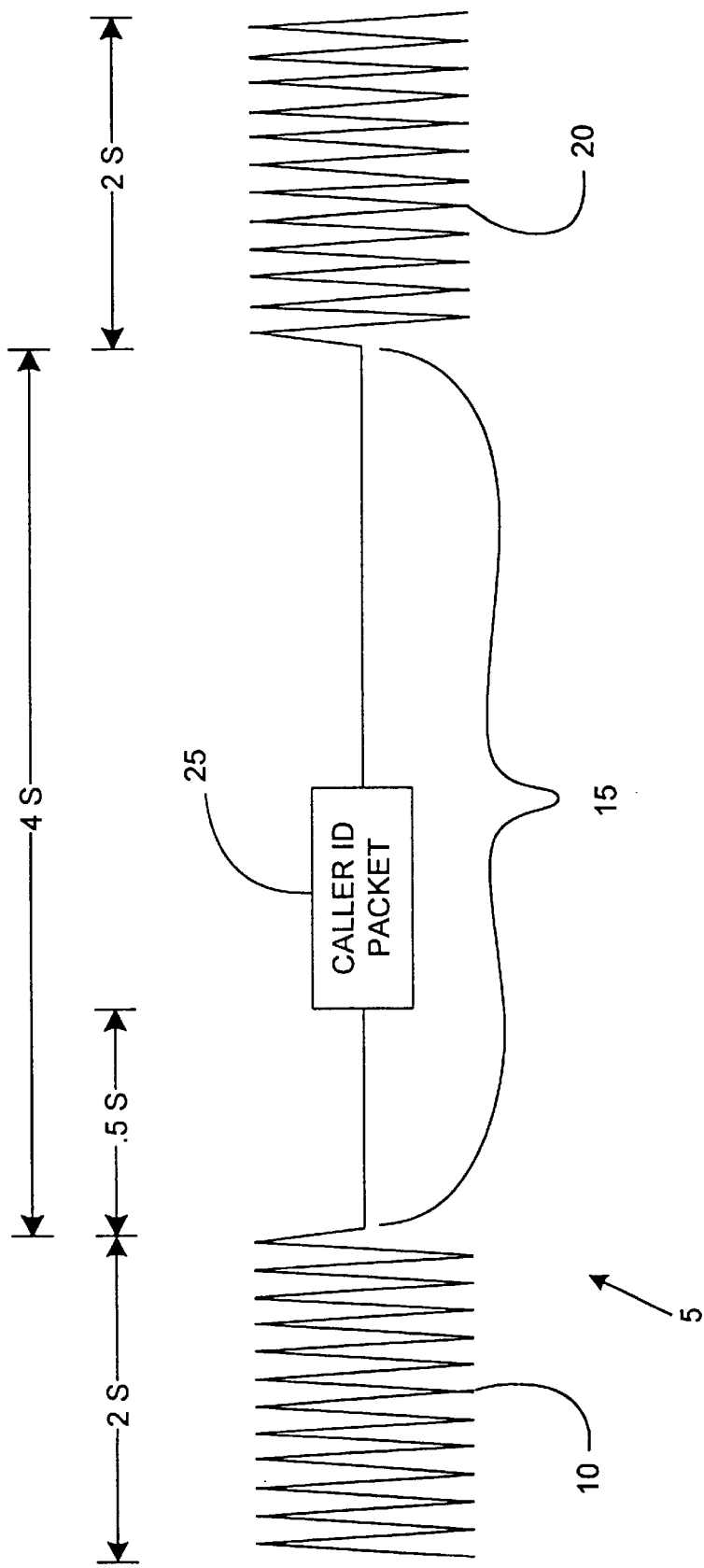
FIG. 1 is a voltage vs. time trace of a typical ring cadence with a caller ID packet.

FIG. 1 shows a typical ring cadence 5 with a caller ID packet 25. Ring cadence 5 is typically a first ring 10 (typically two seconds), followed by a gap 15 (typically four seconds), followed by a second ring 20 of the same duration as first ring 10. This pattern continues until the ringing stops or the call is answered. Caller ID packet 25 is typically transmitted between the first and second rings approximately ½ second after the end of the first ring. The transmission time of caller ID packet 25 is variable depending on the message type and length, but an average time is about 600 milliseconds.

Figure 2:
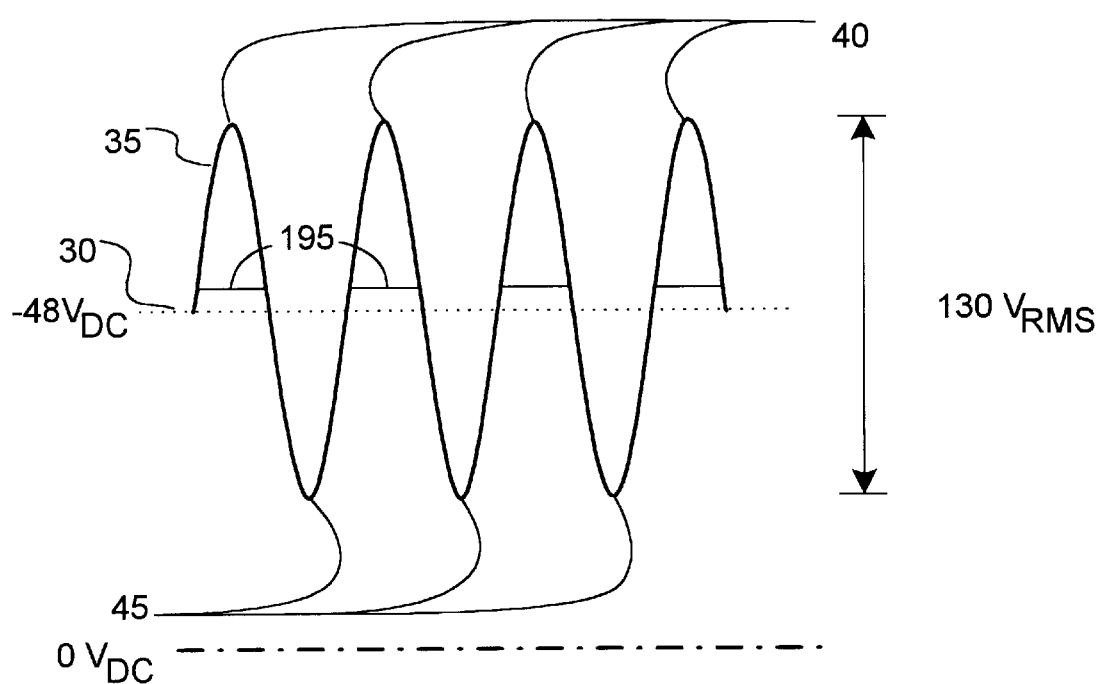
FIG. 2 is a voltage vs. time trace of a portion of a typical ring signal and a suppressed ring signal.

FIG. 2 shows a portion of a typical ring signal. The "on-the-hook" voltage level 30 (or line threshold voltage)

for telephones in the United States is typically 48 volts dc but may vary from 47 to 105 volts dc. Voltage 30 is actually negative, but is referred to here in a positive manner for ease of reference. A telephone is made to ring by superimposing a nominal 90 volts RMS, 20 Hz signal ring 35 on the telephone line. Ring signal 35 includes negative going pulses 40 and positive going pulses 45. The amplitude of ring signal 35 is not standardized and may vary from 40 to 130 volts and 16 to 60 pulses per second (pps). Negative going pulses 40 are counted to obtain the 16 to 60 pps.

When a call is placed to a telephone, the central office places a ring signal on the line of the appropriate frequency, voltage, and cadence. The ring generator at the central office has a current loop detector to determine when the handset is picked up so that the ring may be canceled. This canceling mechanism of the telephone ring is called the "ring trip." When the telephone is off-the-hook, this loop typically carries about 20 milliamps of current from the central office through the telephone set and back to the central office.

The present invention modifies a typical ring signal 35 by selectively suppressing negative going pulses 40 to produce a distinctive ring cadence on all the telephones connected to the same telephone line. Negative going pulses 40 are suppressed without activating the "ring trip."

Figure 3:
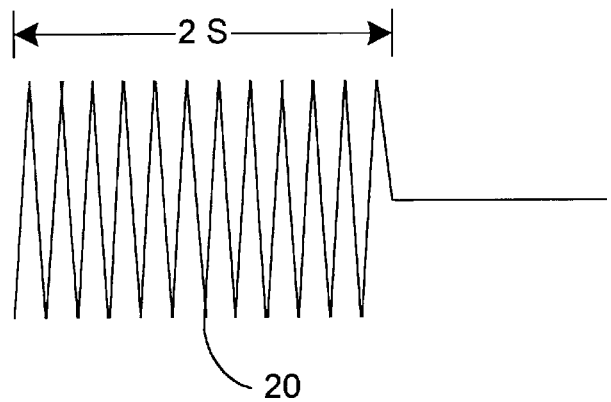
FIG. 3 is a voltage vs. time trace of a normal telephone ring.
Figure 4:
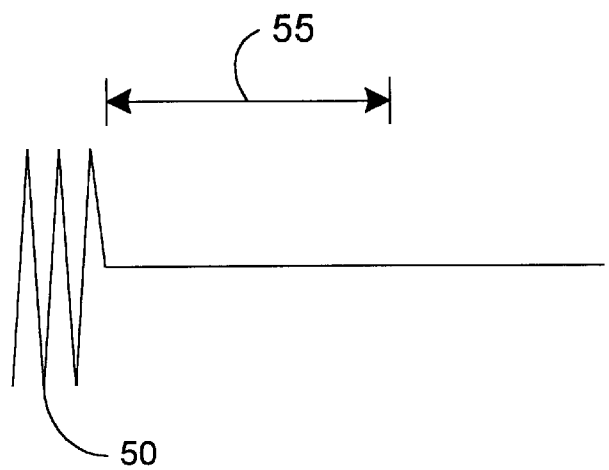
FIG. 4 is a voltage vs. time trace of a short ring of the present invention.
Figure 5:
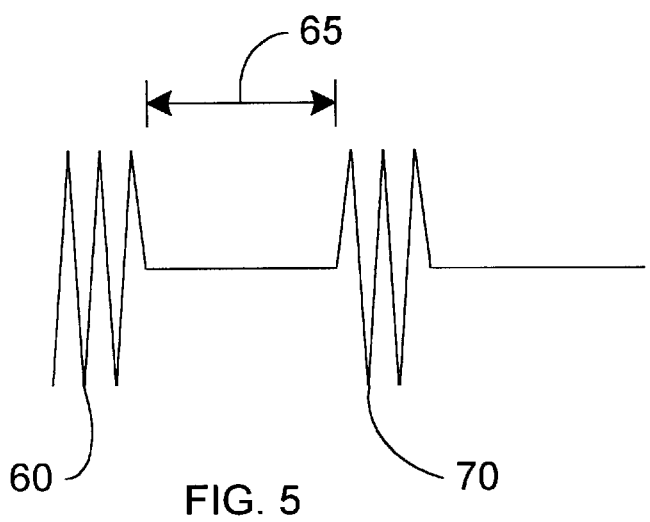
FIG. 5 is a voltage vs. time trace of a double short ring of the present invention.

FIGS. 3–5, in reference to FIG. 1, indicate three unique telephone ring options of the present invention. The present invention additionally provides the option of suppressing the entire telephone ring. FIG. 3 is a ring trace of the normal (unmodified) ring 20 which is typically two seconds in duration. Normal ring 20 is followed by the normal (usually four-second) gap 15 (FIG. 1), which is followed by another normal ring 20. The pattern of ring 20 followed by gap 15 continues until the ringing stops or the handset is lifted.

FIG. 4 is a ring trace of a preferred embodiment short ring 50. Short ring 50 is produced by suppressing a portion 55 of the normal ring 20 (FIG. 3). In the preferred embodiment, short ring 50 is produced by allowing short ring 50 portion of normal ring 20 to sound, while suppressing the remaining portion 55 of normal ring 20. Alternatively, a short ring is produced by allowing any portion of normal ring 20 to sound while suppressing the remaining portion or portions of normal ring 20. The suppressed ring portion 55 is followed by normal gap 15 (FIG. 1), which is followed by another short ring 50. This pattern continues until the ringing stops or the handset is lifted.

FIG. 5 illustrates another unique ring of a preferred embodiment of the present invention, a double short ring 60, 70. In a preferred embodiment, the double short ring 60, 70 is produced by allowing a first short ring 60 of normal ring 20 to sound, suppressing a center portion 65 of normal ring 20, then allowing a second short ring 70 of normal ring 20 to sound. Alternatively, a double short ring is produced by allowing any two portions of normal ring 20 to sound in a manner that each short ring may be distinguished from the other. The second short ring 70 is followed by normal gap 15 which is followed by another double short ring 60, 70. This pattern continues until the ringing stops or the handset is lifted.

The three ring cadences described are only exemplary and the present invention is not limited to these ring types. Alternative ring cadences include a triple ring and a combination of any of the ring types.

Figure 6:
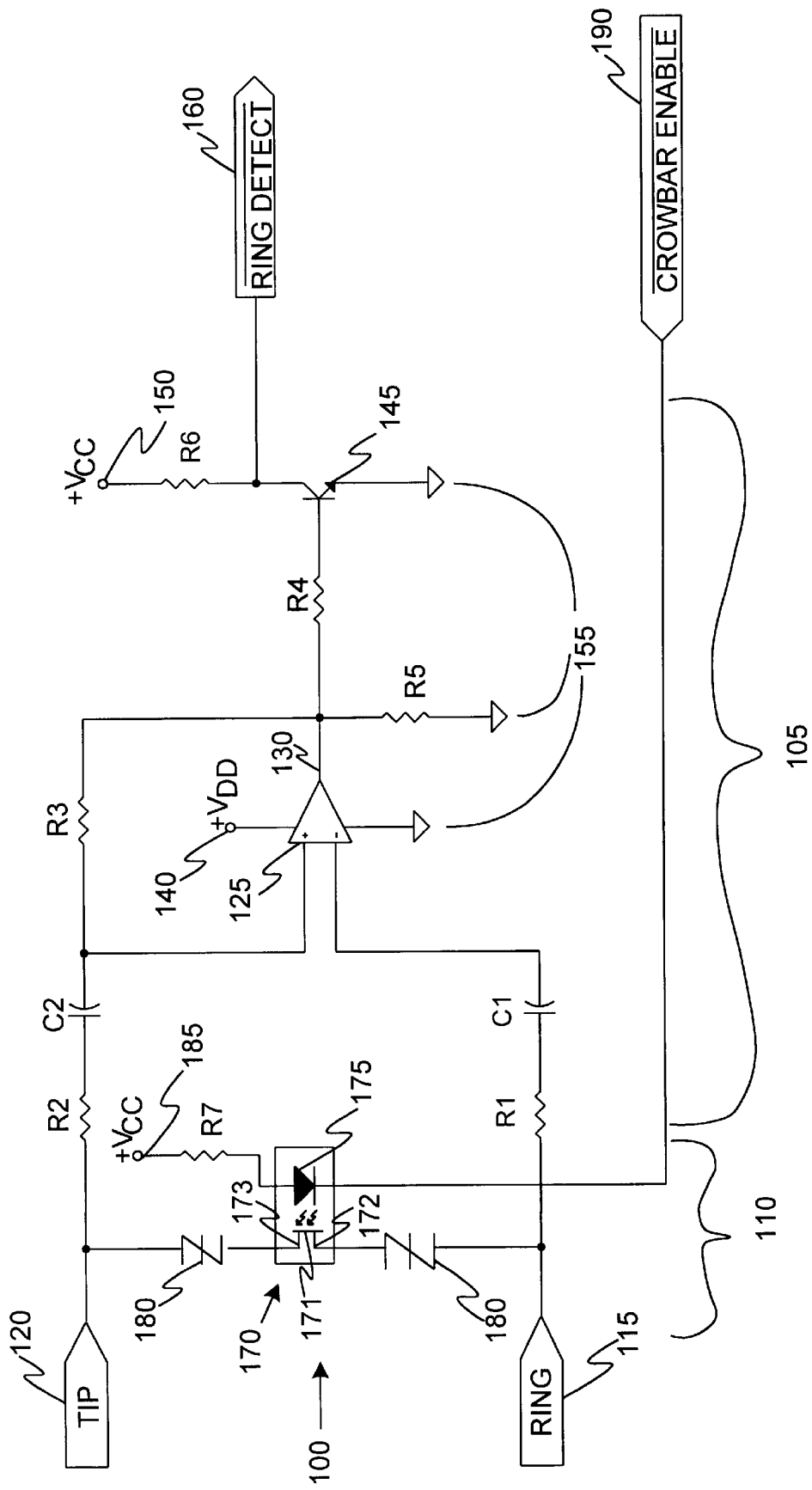
FIG. 6 is a schematic diagram of a ring profiling and detection circuit and a ring suppressing circuit of the present invention.

FIG. 6 represents a preferred embodiment of a circuit 100 for detecting and suppressing a ring signal on a telephone line. Circuit 100 comprises two portions, ring detecting circuit 105 and ring suppressing circuit 110. Ring detecting circuit 105 detects ring signal pulses 40, 45. It is necessary to detect ring signal pulses 40, 45 for two reasons 1) in order to create a ring profile, and 2) to detect the beginning of a ring pulse in order to suppress the pulse. A new ring profile must be created for each call because ring frequencies can and do vary from call to call. Ring suppressing circuit 110 attenuates negative going ring signal pulses 40. The telephone line includes RING line 115 and TIP line 120. The voltage between these two lines 115, 120 is the voltage imposed on the telephone line.

Referring first to ring detecting circuit 105 of circuit 100, first and second resistors R1, R2 are connected to RING line 115 and TIP line 120 respectively. Resistors R1, R2 reduce the amplitude of the ring signal 35 (FIG. 2). The reduced alternating current (AC) signal is capacitively coupled to operational amplifier 125 through first capacitor C1 and second capacitor C2. Operational amplifier 125 amplifies negative going ring pulses 40 (FIG. 2) creating output 130 with corresponding positive pulses having amplitudes which are slightly less than $V_{DD}$ 140. A small amount of hysteresis is provided by coupling output 130 through third resistor R3 to the positive input of operational amplifier 125. The resulting square wave has peaks corresponding to points that ring signal 35 crosses line threshold voltage 30.

Output 130 is coupled to first transistor 145 through fourth resistor R4 and to ground 155 through fifth resistor R5. When output 130 is high, transistor 145 conducts current from first $V_{CC}$ 150 through sixth resistor R6 to ground 155, thus creating a low signal at RING DETECT 160. When output 130 is low, transistor 145 does not conduct current from first $V_{CC}$ 150 to ground 155, thus the potential of first $V_{CC}$ 150 is seen through sixth resistor R6 and RING DETECT 160 is high.

Where electrical functions and connections are described in this disclosure, it is understood that it is possible, within the scope of this invention, to use equivalent circuits to perform the described functions. As an example, a transistor can be used as a diode or resistor. Likewise, two electrical components which are connected may have interceding components which physically separate the two components. "Connected" is, therefore, intended to include components which are in electrical communication despite intervening components.

Ring suppressing circuit 110 of circuit 100 is a non-degenerative crowbar/foldback circuit. Non-degenerative means that ring suppressing circuit 110 will suppress pulse 40 without activating the "ring trip." Second transistor 170 includes gate 171, first input 172, and second input 173. Gate 171 of second transistor 170 is optically coupled to first LED 175. First input 172 of second transistor 170 is connected to RING line 115 and second input 173 of second transistor 170 is connected to TIP line 120. First and second bi-directional voltage limiters 180 are additionally connected in series with second transistor 170 between RING line 115 and TIP line 120. Bi-directional voltage limiters 180 are preferably transient overvoltage protectors with clamping voltages of 2.5 volts sold under the trademark SIDAC-TOR™. First LED 175 is connected in series between second $V_{CC}$ 185 and CROWBAR ENABLE line 190. Second $V_{CC}$ 185 may be the same high voltage source as first $V_{CC}$ 150.

A high voltage signal on CROWBAR ENABLE line 190 prevents current from flowing through first LED 175, thus preventing first LED 175 from emitting light. Without light from first LED 175, gate 171 of second transistor 170 prevents current flow between first 172 and second 173 inputs of second transistor 170. Consequently, the voltage level between RING line 115 and TIP line 120 is unaffected.

A low voltage signal on CROWBAR ENABLE line 190 allows current to flow from first $V_{CC}$ 185 through first LED 175. The current causes first LED 175 to emit light. The light from first LED 175 causes gate 171 of second transistor 170 to allow current to flow between first 172 and second 173 inputs of second transistor 170. With current flowing between the inputs of second transistor 170, bi-directional voltage limiters 180 act to limit the voltage difference between RING line 115 and TIP line 120.

Typical values for the electrical components discussed above are listed in Table 1.

TABLE 1

| Device | Typical Value |
|---|---|
| R1 | 3.9MΩ |
| R2 | 3.9MΩ |
| R3 | 10KΩ |
| R4 | 4.7kΩ |
| R5 | 10kΩ |
| R6 | 4.7kΩ |
| R7 | 470Ω |
| C1 | 0.01 μF |
| C2 | 0.01 μF |

As shown in FIG. 2, portions of ring signal 35 may be suppressed by activating ring suppressing circuit 110 at the beginning of each negative going pulse 40 to create suppressed pulses 195. A variety of ring patterns, including single short ring 50 (FIG. 4) and double short ring 60, 70 (FIG. 5), may be produced by selectively suppressing portions of ring signal 35.

Figure 7:
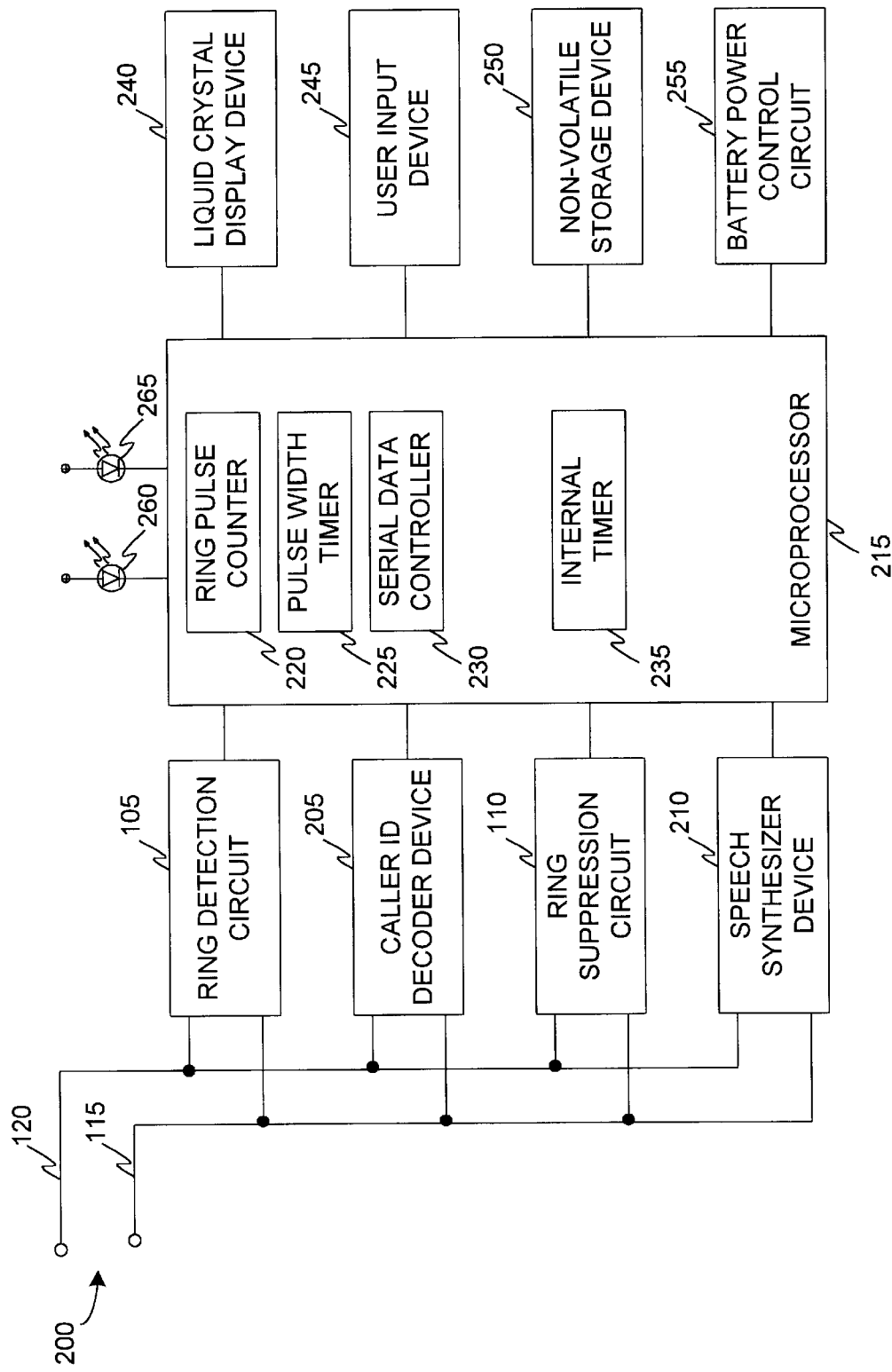
FIG. 7 is a block diagram of one embodiment of the best mode of the present invention.

FIG. 7 shows a block diagram of a preferred embodiment of the present invention. Telephone line 200 comprises RING line 115 and TIP line 120. Ring detection circuit 105, ring suppressing circuit 110, caller ID decoder device 205, and speech synthesizer 210 are each connected between telephone line 200 and microprocessor 215. Caller ID decoder device 205 and speech synthesizer device 210 may be any device known in the art which performs the appropriate function. Speech synthesizer device 210 includes a hold circuit (not pictured). Microprocessor 215 is preferably a highly integrated, eight bit, CMOS microprocessor. Microprocessor 215 comprises, selectively, in hardware, software, or both, ring pulse counter 220, pulse width timer 225, serial data controller 230, and internal timer 235. Each of these devices 220–235 is controlled by microprocessor 215 and may be implemented in by any means known in the art. Microprocessor 215 also provides the means for making all calculating and determinations with respect to the present invention.

Additionally connected to microprocessor 215 are display device 240, input device 245, non-volatile storage 250, battery power control circuit 255, second LED 260 for indicating caller ID log status, and third LED 265 for indicating caller ID information has been received from call waiting. The caller ID log is a chronological list of all of the incoming calls. Second LED 260 flashes to indicate a call or calls have been logged to the caller ID log. Each of these devices 240–265 may be implemented by any means known in the art. The non-volatile storage 250 is used to retain an electronic telephone book of user selected callers with an associated ring style byte.

Figure 8:
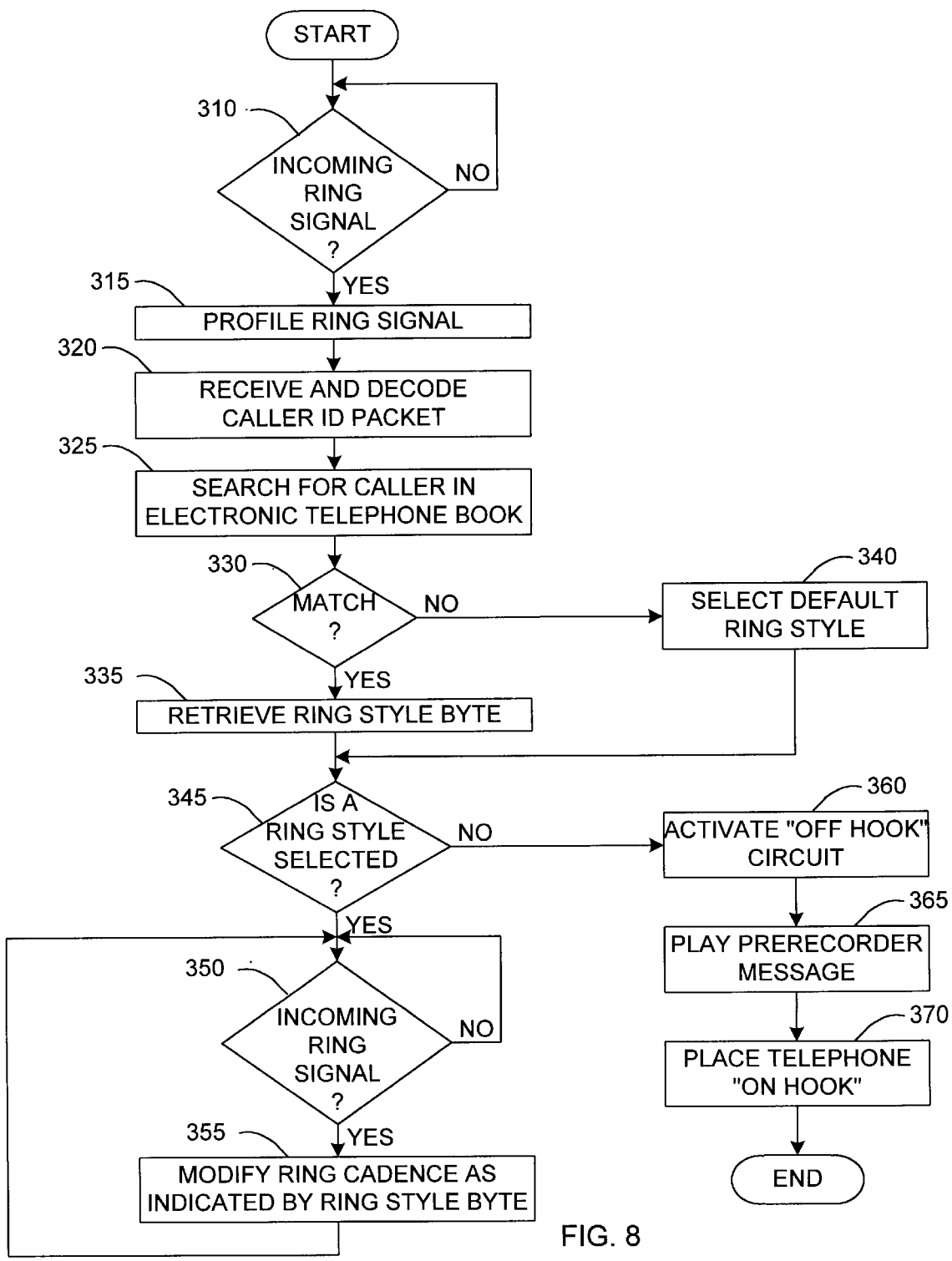
FIG. 8 is a computer flow diagram for control of the present invention.

FIG. 8 shows a flow chart for controlling the present invention. The process may be interrupted at any point by lifting the handset or the ringing stopping. Upon activation, the present invention waits 310 for an incoming first ring 10 (FIG. 1). First ring 10 is used to create 315 a timing profile for modification of the second and subsequent rings 20. Since ringing frequencies can and do change according to ring type specifications (Type A—20 Hz ±3 and 30 Hz ±3 to Type P—15.3 Hz to 34.0 Hz) the circuit must adapt the timing to correctly modify the second and subsequent rings. A new timing profile must be created for each call because the ring frequency may change from one call to the next. Ring type B (15.3 Hz to 68.0 Hz) is the broadest frequency range and has been used as a minimum requirement when pattern matching. The duration and period of each ring pulse 40 is measured and the total number of pulses 40 are counted for first ring 10.

The hardware and software that measure the ring timing profile permits dynamic adaptation to central office variations. There are three critical pieces of information that are collected during the first ring cycle to create the ring profile. The microprocessor 215 (FIG. 7) contains a pulse width timer 225 that is configured to measure the negative going pulse 40 width of first ring 10 and then re-configured to measure the positive going pulse 45 width. The total number of negative going pulses 40 are totalized in the ring pulse counter 220. The accumulated negative going pulse 40 width time is then divided by the number of ring pulses to produce the average negative going pulse 40 width. The accumulated positive going pulse 45 width time is divided by one less than the number of negative going ring pulses 40 to produce the average positive going pulse 45 width.

The caller ID packet 25 is next received and decoded 320. The internal microprocessor 215 then searches 325 the existing database 250 within the electronic telephone book for a match 330 to the telephone number information received. If a match is found, then the ring style byte is retrieved 335 from the database. If no match is found, a default ring style is selected 340. The ring style is analyzed 345 to determine if a ring or voice response is indicated. If a ring response is indicated, the present invention waits 350 for a second ring 20. Second ring 20 is then modified 355 as indicated by the ring style. The process of waiting 350 for and modifying 355 subsequent rings 20 is repeated until the ringing stops or the handset is lifted.

If the matched telephone book entry has a "normal" ring selected, then no modifications are made to the existing ring cadence. If a short ring 50 (FIG. 4) code is found, then ring detecting circuit 105 and ring pulse counter 220 count the appropriate number of pulses which are defined as the number of negative pulses that excursions exceed the −48 volts (zero crossing), until the short ring 50 duration is met. At this point ring suppression circuit 110 is enabled each time the ring signal crosses the line threshold voltage 30. The ring suppressing circuit 110 is transparent at the line threshold voltage 30 due to its high off-state resistance but once enabled and the line voltage reaches break over voltage 195 (FIG. 2) of the bi-directional voltage limiters 180, then the ring suppressing circuit 1 10 will switch from its high off-state resistance to a very low resistance until the line voltage drops or the individual ring pulse 40 is complete. This cycle remains in effect until the ringing stops or the handset is lifted.

If a double short ring 60, 70 (FIG. 5) code is found, then the previous procedure as described is followed with the exception that a pre-determined percentage of the active ring cycle is attenuated. Attenuation for the correct time and duration creates two short rings 60, 70 within the normal two second ring period. This cycle remains in effect until the ringing stops or the handset is lifted.

If a voice message code is found, then the present invention enables the hold circuit associated with speech synthesizer 210 which allows enough loop current to activate 360 the "ring trip." An ADCPM (adaptive differential pulse code modulation) speech processor chip plays 365 a pre-recorded verbal response to the caller offering instructions to remove the anonymous identification block or a simple message refusing all calls from selected numbers. Upon completion of the voice message, the hold circuit is disabled and the telephone is placed 370 back "on-hook." While the present invention has been described by reference to specific embodiments, it will be obvious that other alternative embodiments and methods of implementation or modification may be employed without departing from the true spirit and scope of the invention.

What is claimed is:

1. A system for suppressing ring signal pulses on a telephone line, the ring signal pulses including positive going pulses and negative going pulses, the system comprising:

(a) means for discovering a duration and a frequency of the ring signal pulses the means for discovering including:
      (i) timing means for timing widths of the positive going pulses and the negative going pulses to discover a total positive pulse time and a total negative pulse time;
      (ii) counting means for counting, selectively, the positive going pulses, the negative going pulses, or both the positive and the negative going pulses to produce a pulse count; and,
      (ii) calculating means for calculating the duration and the frequency from the total positive pulse time, the total negative pulse time, and the pulse count; and,
   (b) attenuating means, responsive to the duration and the frequency of the ring signal pulses, for attenuating the ring signal pulses.

2. The system of claim 1 wherein the timing means includes:
   (a) detecting means for detecting at least one of the ring signal pulses;
   (b) a timer;
   (c) means for starting the timer upon detection of each ring signal pulse; and,
   (d) means for stopping the timer when each ring signal pulse is no longer detected.

3. The system of claim 1 wherein the counting means includes:
   (a) detecting means for detecting at least one of the ring signal pulses;
   (b) a counter;
   (c) means for incrementing the counter upon detection of each ring signal pulse.

4. The system of claim 1 wherein the attenuating means includes limiting means for limiting an amplitude of each ring signal pulse.

5. A device for determining the identity of a telephone caller by modifying a ring signal, the ring signal including ring signal pulses, the ring signal pulses including positive going pulses and negative going pulses, the device comprising:

(a) means for discovering a duration and a frequency of the ring signal pulses, the means for discovering including:
      (i) timing means for timing widths of the positive going pulses and the negative going pulses to discover a total positive pulse time and a total negative pulse time;
      (ii) counting means for counting, selectively, the positive going pulses, the negative going pulses, or both the positive and the negative going pulses to produce a pulse count; and,
      (iii) calculating means for calculating the duration and the frequency from the total positive pulse time, the total negative pulse time, and the pulse count;
   (b) means for decoding a caller ID packet to determine the identity of the caller;
   (c) a storage device for storing saved caller information, the saved caller information including caller ring cadence selections and caller identities;
   (d) means for selecting a unique ring cadence from the saved caller information and identity of the caller; and,
   (e) attenuating means for attenuating the ring signal pulses in accordance with the unique ring cadence.

6. The system of claim 5 wherein the timing means includes:
   (a) detecting means for detecting at least one of the ring signal pulses;
   (b) a timer;
   (c) means for starting the timer upon detection of each ring signal pulse; and,
   (d) means for stopping the timer when each ring signal pulse is no longer detected.

7. The system of claim 5 wherein the counting means includes:
   (a) detecting means for detecting at least one of the ring signal pulses;
   (b) a counter;
   (c) means for incrementing the counter upon detection of each ring signal pulse.

8. The system of claim 5 wherein the attenuating means includes limiting means for limiting an amplitude of each pulse.

9. A method for suppressing ring signal pulses on a telephone line, the ring signal pulses including positive going pulses and negative going pulses, the method comprising:

(a) discovering a duration and a frequency of the ring signal pulses, the discovering including:
      (i) timing widths of the positive going pulses and the negative going pulses to discover a total positive pulse time and a total negative pulse time;
      (ii) counting, selectively, the positive going pulses, the negative going pulses, or both the positive and the negative going pulses to produce a pulse count; and,
      (iii) calculating the duration and the frequency from the total positive pulse time, the total negative pulse time, and the pulse count; and,
   (b) attenuating the ring signal pulses, responsive to the duration and the frequency of the ring signal pulses.

10. The method of claim 9 wherein the timing step includes:
    (a) detecting at least one of the ring signal pulses;
    (b) starting a timer upon detection of each ring signal pulse; and,
    (c) stopping the timer when each ring signal pulse is no longer detected.

11. The method of claim 9 wherein the counting step includes:
    (a) detecting at least one of the ring signal pulse; and,
    (b) incrementing a counter upon detection of each ring signal pulse.

12. The method of claim 9 wherein the attenuating step includes limiting an amplitude of each ring signal pulse.

13. A method for identifying a telephone caller by modifying a ring signal, the ring signal including ring signal pulses, the ring signal pulses including positive going pulses and negative going pulses, the method comprising:
   (a) discovering a duration and a frequency of the ring signal pulses, the discovering including:
      (i) timing widths of the positive going pulses and the negative going pulses to discover a total positive pulse time and a total negative pulse time;
      (ii) counting, selectively, the positive going pulses, the negative going pulses, or both the positive and the negative going pulses to produce a pulse count; and,
      (iii) calculating the duration and the frequency from the total positive pulse time, the total negative pulse time, and the pulse count;
   (b) decoding a caller ID packet to determine the identity of the caller;
   (c) selecting a unique ring cadence from the identity of the caller and saved caller information; and,
   (d) attenuating the ring signal pulses in accordance with the unique ring cadence.

14. The method of claim 13 wherein the timing step includes:
   (a) detecting at least one of the ring signal pulses;
   (b) starting a timer upon detection of each ring signal pulse; and,
   (c) stopping the timer when each ring signal pulse is no longer detected.

15. The method of claim 13 wherein the counting step includes:
   (a) detecting at least one of the ring signal pulse; and,
   (b) incrementing a counter upon detection of each ring signal pulse.

16. The method of claim 13 wherein the attenuating step includes limiting an amplitude of each pulse.

* * * * *